United States Patent
Dall'Occo et al.

(10) Patent No.: US 6,716,940 B1
(45) Date of Patent: Apr. 6, 2004

(54) CATALYST FOR THE POLYMERIZATION OF OLEFINS

(75) Inventors: Tiziano Dall'Occo, Ferrara (IT); Giovanni Baruzzi, Ferrara (IT); Diego Brita, Ferrara (IT); Mario Sacchetti, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/070,120

(22) PCT Filed: Aug. 29, 2000

(86) PCT No.: PCT/EP00/08408

§ 371 (c)(1),
(2), (4) Date: Feb. 28, 2002

(87) PCT Pub. No.: WO01/19879

PCT Pub. Date: Mar. 22, 2001

(30) Foreign Application Priority Data

Sep. 10, 1999 (EP) .............................. 99202965

(51) Int. Cl.$^7$ .................................. C08F 4/42
(52) U.S. Cl. ............ 526/124.3; 526/151; 526/153; 526/158; 526/348; 526/352; 502/103; 502/132
(58) Field of Search ................ 526/153, 151, 526/158, 124.3, 348, 352; 502/103, 132

(56) References Cited

U.S. PATENT DOCUMENTS

| | | | | |
|---|---|---|---|---|
| 4,071,672 A | * | 1/1978 | Kashiwa | 526/122 |
| 4,220,554 A | | 9/1980 | Scatá et al. | 252/429 B |
| 4,298,718 A | | 11/1981 | Mayr et al. | 526/125 |
| 4,342,855 A | | 8/1982 | Akimoto et al. | 526/124 |
| 4,399,054 A | | 8/1983 | Ferraris et al. | 252/429 B |
| 4,469,648 A | | 9/1984 | Ferraris et al. | 264/9 |
| 4,495,338 A | | 1/1985 | Mayr et al. | 526/125 |
| 4,767,735 A | * | 8/1988 | Ewen et al. | 502/109 |
| 5,139,986 A | * | 8/1992 | Cook et al. | 502/112 |
| 5,550,094 A | * | 8/1996 | Ali et al. | 502/115 |
| 5,733,987 A | | 3/1998 | Covezzi et al. | 526/65 |
| 6,127,304 A | * | 10/2000 | Sacchetti et al. | 502/125 |

FOREIGN PATENT DOCUMENTS

| | | | |
|---|---|---|---|
| EP | 0395083 | 10/1990 | C08F/4/02 |
| EP | 0435557 | 7/1991 | C08F/4/462 |
| EP | 0528558 | 2/1993 | C08F/210/52 |
| EP | 0553805 | 8/1993 | C08F/10/00 |
| EP | 0553806 | 8/1993 | C08F/10/00 |
| EP | 0601525 | 6/1994 | C08F/4/654 |
| JP | 58127710 | 9/1983 | |
| WO | 9221706 | 12/1992 | C08F/10/00 |
| WO | 9303078 | 2/1993 | C08F/297/08 |
| WO | 9517434 | 6/1995 | C08F/2/34 |
| WO | 9525758 | 9/1995 | C08F/210/02 |
| WO | 9844001 | 10/1998 | C07K/16/00 |

* cited by examiner

*Primary Examiner*—Ling-Siu Choi

(57) ABSTRACT

Catalyst system for the polymerization of olefins $CH_2=CHR$, wherein R is hydrogen or a hydrocarbon radical having 1–12 carbon atoms, comprising the product of the reaction between (a) a solid catalyst component comprising Mg, Ti, and halogen, (b) dimethylaluminium chloride (DMAC) and (c) an alkylaluinium compound, in which the molar ratio between (b) and (c) is lower than 10. This kind of catalyst system is particularly suitable for the preparation of copolymers of ethylene with α-olefins due to its high capacity for incorporating the comonomer while at the same time maintaining high yields.

24 Claims, No Drawings

CATALYST FOR THE POLYMERIZATION OF OLEFINS

The present invention relates to catalysts for the polymerization of olefins $CH_2=CHR$, wherein R is hydrogen or a hydrocarbon radical having 1–12 carbon atoms. In particular, the present invention relates to a catalyst obtained by reacting a solid catalyst component, based on Mg, Ti and halogen, with a particular pair of alkyl-Al compounds. This kind of catalyst is particularly suitable for the preparation of copolymers of ethylene with α-olefins due to its high capacity for incorporating the comonomer while at the same time maintaining high yields.

Accordingly, another object of the present invention is the use of said catalysts in a process for the copolymerization of olefins in order to produce ethylene/α-olefin copolymers.

Linear low-density polyethylene (LLDPE) is one of the most important products in the polyolefin field. Due to its characteristics, it finds application in many sectors and in particular in the field of wrapping and packaging of goods where, for example, the use of stretchable films based on LLDPE constitutes an application of significant commercial importance. LLDPE is commercially produced with liquid phase processes (solution or slurry) or via the more economical gas-phase process. Both processes involve the widespread use of Ziegler Natta $MgCl_2$-supported catalysts that are generally formed by the reaction of a solid catalyst component, in which a titanium compound is supported on a magnesium halide, with an alkylaluminium compound.

In order to be advantageously usable in the preparation of LLDPE, said catalysts are required to show high comonomer incorporation properties and good comonomer distribution suitably coupled with high yields.

The requirement of high comonomer incorporation is particularly important in the case of gas-phase production processes because the use of excessively large amounts of α-olefin in the feed mixture can cause condensation phenomena in the gas-phase reactor. Therefore, the use of a catalyst having a high capacity for incorporating the comonomer would make it possible to lower the amount α-olefin monomer in the feed.

It is known in the art that the use of different co-catalysts can modulate certain;properties of the solid catalyst component like, for example, polymerization activity, ability to produce higher or lower molecular weights polymers, comonomer distribution, etc. In particular, it is reported in the art that the use of dimethylaluminium chloride with respect to a trialkylaluminium, would give catalysts capable of producing ethylene polymers with a broader Molecular Weight Distribution (MWD) and also capable of incorporating a higher amount of comonomer. However, all the above improvements are made redundant by the fact that the yields are dramatically decreased.

International patent application WO 95/17434 discloses a catalyst system aimed at solving this problem. It is characterized by the use of DMAC/trialkylaluminium (TAA) co-catalyst mixtures in molar ratios from 30 to 300. Table 1 of said application shows that when the DMAC/TAA molar ratio is higher than 30, a high Melt Flow Ratio (indicating a broad MWD) and a melt index in the range 10–20 are obtained. The incorporation of a comonomer in this range of DMAC/TAA molar ratio appears to increase slightly as a function of the TAA content (it passes from 2.1% with the use of pure DMAC to 2.3% with the use of a DMAC/TAA molar ratio of 30). The yields however are very low in this range if compared with the TAA alone. In particular, the activity of the best invention example of Table 1 (Example 4) is about 160 times lower than the activity obtained with triethylaluminium (TEAL) alone. On the other hand, said application shows that when DMAC/TAA molar ratios lower than 30 are used, the Molecular Weight of the polymer decreases (the melt index in the range 20–60), the MWD becomes narrower (Melt Flow Ratios lower than 30 are obtained) and, most importantly, at the same time the incorporation of comonomer does not increase (the value of 2.3% remains constant). All the above drawbacks are not offset by the slight increase in activity which, for a DMAC/TEAL molar ratio of 20, remains about 85 times lower than that for TEAL alone.

Contrary to the strong suggestion of using a large excess of DMAC with respect to the alkylaluminium, we have surprisingly discovered that the use of DMAC/alkylaluminium compound co-catalyst mixtures having lower molar ratios gives catalysts with completely unexpected properties. Said catalysts in fact have a very high capacity for incorporating the co-monomer while at the same time displaying activity which is higher than that obtainable by the use of the aluminium alkyl alone.

Accordingly, an object of the present invention is a catalyst system comprising the product of the reaction between (a) a solid catalyst component comprising Mg, Ti, halogen and optionally an electron donor compound, (b) dimethylaluminium chloride (DMAC) and (c) an compound in which the molar ratio between (b) and (c) is lower than 10.

In the reaction with component (a), the DMAC and the alkyaluminium compound are preferably used in molar ratios from 0.01 to 5 and more preferably between 0.3 and 3.

The alkylaluminium compound can be selected from the compounds of formula $AlR^1{}_{3-y}H_y$ where y is from 0 to 2 and $R^1$ is a hydrocarbon group having from 1 to 15 carbon atoms. Preferably, the alkylaluminium compound (c) is selected from those of the above formula in which y is 0 and $R^1$ is a C2–C10 alkyl radical. Examples of suitable aluminium alkyl compounds are di-(2,4,4-trimethylpentyl) aluminium hydride, triethylaluminum, triisopropylaluminum, triisobutylaluminum, tri-n-hexylaluminum and tri-(2,4,4-trimethylpentyl)aluminium. The use of triethyl- or triisobutylaluminium is especially preferred.

As explained above, the component (a) of the invention is a solid catalyst component comprising Ti, Mg and halogen. In particular, the said catalyst component comprises a titanium compound supported on a magnesium halide. The magnesium halide is preferably $MgCl_2$ in active form, which is widely known from the patent literature as a support for Ziegler-Natta catalysts. Patents U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the most intense line.

The preferred titanium compounds are those of formula $Ti(OR^2)_{n-y}X_y$, where X is halogen, preferably chlorine, n is the valence of titanium, y is a number between 0 and n, and the $R^2$ groups, which may be identical or different, are hydrocarbon radicals having from 1 to 10 carbon atoms. Particularly preferred titanium compounds are $TiCl_4$, $TiCl_3$, titanium (IV) butoxide and titanium (IV) isopropoxide, trichlorobutoxy titanium (IV) and dichlorobutoxytitanium (III).

The preparation of the solid catalyst component can be carried out according to several methods. According to one of these methods, the product obtained by co-milling the magnesium chloride in an anhydrous state and the titanium compound is treated with halogenated hydrocarbons such as 1,2-dichloroethane, chlorobenzene, dichloromethane, etc. The treatment is carried out for a time between 1 and 4 hours and at a temperature ranging from 40° C. to the boiling point of the halogenated hydrocarbon. The product obtained is then generally washed with inert hydrocarbon solvents such as hexane.

According to another method, magnesium dichloride is pre-activated according to well-known methods and then treated with an excess of Ti compound at a temperature of about 80 to 135° C. The treatment with the Ti compound is repeated and the solid is washed with hexane in order to eliminate any non-reacted Ti compound.

A further method comprises the reaction between magnesium alkoxides or chloroalkoxides (in particular chloroalkoxides prepared according to U.S. Pat. No. 4,220,554) and an excess of $TiCl_4$ in solution at a temperature of about 80 to 120° C.

According to a preferred method, the solid catalyst component can be prepared by reacting a titanium compound of the formula disclosed above with a magnesium chloride derived from an adduct of formula $MgCl_2 \cdot pR^3OH$, where p is a number between 0.1 and 6, preferably from 2 to 3.5, and $R^3$ is a hydrocarbon radical having 1–18 carbon atoms. The adduct can be suitably prepared in spherical form by mixing alcohol and magnesium chloride in the presence of an inert hydrocarbon which is immiscible with the adduct, operating under stirred conditions at the melting point of the adduct (100–130° C.). The emulsion is then quickly quenched, thereby causing the solidification of the adduct in the form of spherical particles. Examples of spherical adducts prepared according to this procedure are described in U.S. Pat. Nos. 4,399,054 and 4,469,648.

The adduct thus obtained can be reacted directly with the Ti compound, preferably $TiCl_4$, or it can be subjected beforehand to controlled thermal dealcoholation (80–130° C.) so as to obtain an adduct in which the number of moles of alcohol is generally lower than 3, preferably between 0.1 and 2.5. The reaction with the Ti compound can be carried out by suspending the adduct (optionally dealcoholated) in the liquid Ti compound (generally at 0° C.); the mixture is heated to 80–130° C. and kept at this temperature for 0.5–2 hours. The treatment with the Ti compound can be carried out one or more times.

The preparation of catalyst components in spherical form according to this procedure is described for example in European Patent Applications EP-A-395083, EP-A-553805 and WO 98/44001. According to a variation of the method described above the preparation of the solid catalyst components can comprise (i) reacting a compound $MgCl_2 \cdot mROH$, wherein $0.3 \leq m \leq 1.7$ and R is an alkyl, cycloalkyl or aryl radical having 1–12 carbon atoms, with a titanium compound of the formula $Ti(OR^2)_{n-y}X_y$, given above; (ii) reacting the product obtained from (i) with an Al-alkyl compound and (iii) reacting the product obtained from (ii) with a titanium compound of the formula $Ti(OR'')_nX_{y-n}$, in which n, y, X and $R''$ have the meanings explained above. As mentioned above, the compound $MgCl_2 \cdot mROH$ can be prepared by thermal dealcoholation of adducts $MgCl_2 \cdot pEtOH$, having a higher alcohol content. Preferred titanium compounds used in step (i) and (iii) are titanium tetrahalides, in particular $TiCl_4$ Particularly preferred in step (ii) is the use of the trialkyl aluminum compounds such as those disclosed above.

According to another embodiment, the $MgCl_2 \cdot pR^3OH$ adduct is first thermally dealcoholated according the procedure described above and successively placed in contact with reactive compounds capable of removing the alcohol. Suitable reactive compounds are, for example, alkyl-Al compounds or $SiCl_4$. The adduct thus obtained is then reacted with a titanium compound in order to obtain the final solid catalyst component. The preparation of catalyst components in spherical form according to this procedure is described for example in EP-A-553806, and EP-A-601525.

The solid catalyst components obtained with methods including the use of MgCl2.alcohol adducts show a surface area (by the B.E.T. method) generally of between 20 and 500 $m^2/g$ and preferably between 50 and 400 $m^2/g$, and a total porosity (by the B.E.T. method) of higher than 0.2 $cm^3/g$, preferably between 0.2 and 0.6 $cm^3/g$. The porosity (Hg method) due to pores with a radius up to 10.000Å generally ranges from 0.3 to 1.5 $cm^3/g$, preferably from 0.45 to 1 $cm^3/g$.

In the methods disclosed above the titanium compound to be supported on the magnesium dihalide is normally pre-formed. Alternatively, it can also be produced in-situ, for example by the reaction of a titanium tetrahalide, in particular $TiCl_4$, with an alcohol $R^2OH$ or with titanium alkoxides having the formula $Ti(OR^2)_4$. When the preparation of the catalyst component includes the use of an $MgCl_2 \cdot pR^3OH$ adduct, the titanium compound can be obtained by the reaction of a titanium tetrahalide, in particular $TiCl_4$, with the OH groups of the residual alcohol present in a combined form in said magnesium dihalide.

According to another embodiment, the final titanium compound can be obtained by the reaction of a titanium tetraalkoxide with halogenating compounds such as, for instance, $SiCl_4$, $AlCl_3$ or chlorosilanes.

In some instances it is convenient that the titanium compound be reduced to a valence of lower than 4. For example, titanium haloalkoxides with a valence of lower than 4 can also be formed by means of the reaction of titanium tetraalkoxides with mixtures of halogenating and reducing compounds like, for example, silicon tetrachloride and polyhydrosiloxanes. Moreover, it is also possible to use a halogenating agent which simultaneously acts as a reducing agent, such as, for instance, an alkyl-Al halide.

As mentioned above, the solid catalyst component to be used in combination with the DMAC/alkylaluminum mixture may comprise an electron donor compound (internal donor), preferably selected from ethers, esters, amines and ketones.

Said compound is necessary when the component is used in the stereoregular (co)polymerization of olefins such as propylene, 1-butene or 4-methyl-1-pentene. In particular, the internal electron donor compound can be suitably selected from the alkyl, cycloalkyl or aryl esters of polycarboxylic acids, such as for example esters of phthalic, succinic and maleic acid, in particular n-butyl phthalate, diisobutyl phthalate, di-n-octyl phthalate and di-n-hexyl phthalate diethyl 2,3-diisopropylsuccinate.

Other electron donor compounds advantageously usable are the 1,3-diethers of the formula:

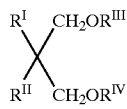

wherein R' and R'', which may be identical or different, are alkyl, cycloalkyl, aryl radicals having 1–18 carbon atoms or hydrocarbon radicals that can be linked together to form condensed structures, and R''' and R'''', which may be identical or different, are alkyl radicals having 1–4 carbon atoms.

The electron donor compound is generally present in a molar ratio with respect to the magnesium from 1:4 to 1:20.

As previously explained, the catalysts of the invention are obtained by reacting (a) a solid catalyst component comprising Mg, Ti, halogen and optionally an electron donor compound, with (b) dimethylaluminium chloride (DMAC) and (c) an alkylaluminium compound in which the molar ratio between (b) and (c) is lower than 10.

The reaction between the three components can be carried out in several different ways, depending on which certain properties of the catalysts can be particularly enhanced with respect to the others. On the basis of the following guidelines, the reaction conditions can be properly selected by a person skilled in the art in order to obtain the catalyst having the required balance of properties. For example, a catalyst having a very high activity and a relatively lower capacity for incorporating the co-monomer is obtained by first placing the components (a) and (c) in contact and then reacting the product thus obtained with the component (b). In this case, the component (b) can be added directly to the polymerization reactor. Catalysts having a better a balance between activity and good capacity for incorporating the co-monomer are obtainable by placing the component (a) in contact with a mixture of (b) and (c) or, preferably, by first placing the components (a) and (b) in contact and then reacting the product thus obtained with the component (c). Also in this case, the component (c) or the mixture of (b) and (c) can be added directly to the polymerization reactor. We also found that if the addition of component (c) is in some way delayed, for example because a polymerization diluent and possibly also the monomer are added before, it is possible to obtain a catalyst displaying an exceptional capacity for incorporating the comonomer together with a relatively lower polymerization activity.

In all the above-disclosed methods, the DMAC and alkylaluminum compounds are normally used in solution or suspension in a hydrocarbon medium such as propane, pentane, hexane, heptane, benzene, toluene, or in halogenated hydrocarbons such as dichloromethane, dichloroethane and $CCl_4$.

The component (a) can be used to prepare the catalyst composition as obtained directly from its preparation process. Alternatively, it can be pre-polymerized with ethylene and/or α-olefins before being used in the main polymerization process. This is particularly preferred when the main polymerization process is carried out in the gas phase. In particular, it is especially preferred to pre-polymerize ethylene or mixtures thereof with one or more a-olefins, said mixtures containing up to 20 mol % of α-olefin, forming amounts of polymer from about 0.1 g per gram of solid component up to about 100 g per gram of solid catalyst component. The pre-polymerization step can be carried out at temperatures from 0 to 80° C., preferably from 5 to 50° C., in the liquid or gas phase. The pre-polymerization step can be performed in-line as a part of a continuous polymerization process or separately in a batch process. The batch pre-polymerization of the catalyst of the invention with ethylene in order to produce an amount of polymer ranging from 0.5 to 20 g per gram of catalyst component is particularly, preferred. The prepolymerized catalyst component can also be subject to a further treatment with a titanium compound before being used in the main polymerization step. In this case the use of $TiCl_4$ is particularly preferred. The reaction with the Ti compound can be carried out by suspending the prepolymerized catalyst component in the liquid Ti compound optionally in mixture with a liquid diluent; the mixture is heated to 60–120° C. and kept at this temperature for 0.5–2 hours.

The presence of a pre-polymerization step makes it possible to react the components (a) to (c) of the present invention according to different embodiments. In one of them, the component (a) is prepolymerized by using only an alkylaluminum compound as a cocatalyst. The so obtained prepolymerized catalyst component can then be used in the main polymerization process together with the DMAC/alkylaluminum mixture of the invention thereby obtaining the described advantages with respect to a polymerization step carried out only with the alkylaluminium compound.

According to another embodiment the catalyst component (a) is reacted directly in the prepolymerization step with a mixture of DMAC and alkyaluminum used as co-catalyst. The so obtained prepolymerized catalyst component can then be used in the main polymerization process in combination with a cocatalyst that can be either an alkylaluminiurn compound or a DMAC/alkylaluminium mixture. The use of DMAC/alkylaluminium mixture is preferred. In case an alkylaluminium compound is used as cocatalyst however, the skilled in the art should avoid any washing of the prepolymerized catalyst component in order to preserve its ability to give the advantages described above. As mentioned, the main polymerization process using the catalyst of the invention can be carried out according to known techniques either in liquid or gas phase using, for example, the known technique of the fluidized bed or under conditions wherein the polymer is mechanically stirred. Preferably, the process is carried out in the gas phase.

Examples of gas-phase processes wherein it is possible to use the catalysts of the invention are described in WO 92/21706, U.S. Pat. No. 5,733,987 and WO 93/03078. These processes comprise a pre-contact step of the catalyst components, a pre-polymerization step and a gas phase polymerization step in one or more reactors in a series of fluidized or mechanically stirred bed. The catalysts of the present invention are particularly suitable for preparing linear low density polyethylenes (LLDPE, having a density lower than 0.940 $g/cm^3$) and very-low-density and ultra-low-density polyethylenes (VLDPE and ULDPE, having a density lower than 0.920 $g/cm^3$, to 0.880 $g/cm^3$) consisting of copolymers of ethylene with one or more alpha-olefins having from 3 to 12 carbon atoms, having a mole content of units derived from ethylene of higher than 80%. However, they can also be used to prepare a broad range of polyolefin products including, for example, high density ethylene polymers (HDPE, having a density higher than 0.940 $g/cm^3$), comprising ethylene homopolymers and copolymers of ethylene with alpha-olefins having 3–12 carbon atoms; elastomeric copolymers of ethylene and propylene and elastomeric terpolymers of ethylene and propylene with smaller proportions of a diene having a content by weight of units derived from ethylene of between about 30 and 70%; isotactic polypropylenes and crystalline copolymers of propylene and ethylene and/or other alpha-olefins having a content of units derived from propylene of higher than 85% by weight; impact resistant polymers of propylene obtained by sequential polymerization of propylene and mixtures of propylene with ethylene, containing up to 30% by weight of ethylene; copolymers of propylene and 1-butene having a number of units derived from 1-butene of between 10 and 40% by weight.

The following examples are given in order to further describe the present invention in a non-limiting manner.

CHARACTERIZATION

The properties are determined according to the following methods:

Melt Index: measured at 190° C. according to ASTM D-1238 condition "E" (load of 2.16 Kg) and "F" (load of 21.6 Kg);

The ratio between MI F and MI E (indicated as F/E) is thus defined as the melt flow ratio (MFR).

Fraction soluble in xylene. The solubility in xylene at 25° C. was determined according to the following method: About 2.5 g of polymer and 250 ml of o-xylene were placed in a round-bottomed flask provided with cooler and a reflux condenser and kept under nitrogen. The mixture obtained was heated to 135° C. and was kept under stirring for about 60 minutes. The final solution was allowed to cool to 25° C. under continuous stirring, and was then filtered. The filtrate was then evaporated in a nitrogen flow at 140° C. to reach a constant weight. The content of said xylene-soluble fraction is expressed as a percentage of the original 2.5 grams.

Thermal analysis: Calorimetric measurements were performed by using a Mettler DSC differential scanning calorimeter. The instrument was calibrated with indium and tin standards. The weighed sample (5–10 mg), was sealed into aluminium pans, heated to 200° C. and kept at that temperature for a time long enough (5 minutes) to allow a complete melting of all the crystallites. Successively, after cooling at 20° C./min to −20° C., the peak temperature was assumed as crystallization temperature (Tc). After standing for 5 minutes at 0° C., the sample was heated to 200° C. at a rate of 10° C./min. In this second heating run, the peak temperature was assumed as the melting temperature (Tm) and the area as the global melting enthalpy (AH).

Comonomer Content

1-Butene was determined via Infrared Spectrometry.

The α-olefins higher than 1-butene were determined via $^1H$ NMR analysis. The total area of the $^1H$ NMR spectrum (between 2.5 and 0.5 ppm) was divided in two regions:

A, between 2.5–1.1 ppm for $CH_2$ and CH
B, between 1.1–0.5 ppm for $CH_3$

The copolymer composition was then calculated using the following equations:

$$Cn \ (\text{mol. } \%) = \frac{I_B/3}{Tot} \cdot 100$$

$$E \ (\text{mol. } \%) = \frac{\{I_A - [(I_B/3) \cdot (2n-3)]\}/4}{Tot} \cdot 100$$

where:
Tot=Cn+E
n=number of 1-olefin C-atoms
$I_A$, $I_B$=integrals of the regions A and B respectively.
Effective density: ASTM-D 1505

EXAMPLES

Preparation of the Spherical Support ($MgCl_2$/EtOH Adduct)

The adduct of magnesium chloride and alcohol was prepared according to the method described in Example 2 of U.S. Pat. No. 4,399,054, but operating at 2000 rpm instead of 10,000 rpm. The adduct containing approximately 3 mol of alcohol had an average size of approximately 60 μm, with a dispersion range of approximately 30–90 μm.

Preparation of the Solid Component

The spherical support, prepared according to the general method, was subjected to thermal treatment, under nitrogen flow, within the temperature range of 50–150° C., until spherical particles having a residual alcohol content of about 35 wt. % (1.1 mol of alcohol per mole of $MgCl_2$) were obtained.

600 g of this support, in suspension with 3 $dm^3$ of anhydrous heptane, were loaded into a 5 $dm^3$ reactor. With stirring at 20° C., 260 g of TEAL dissolved in heptane (100 g/$dm^3$) were slowly added: The temperature was raised to 40° C. over 60 minutes and kept constant for 120 minutes. Stirring was discontinued, settling was allowed to occur and the clear phase was removed. The residue was washed 3 times with anhydrous heptane and then dispersed with 3 $dm^3$ of anhydrous heptane. Stirring was initiated and at 20° C., over a period of 60 minutes, the reaction product was fed with 1100 g of $Ti(OBu)_4$ and 850 g of $SiCl_4$ (solution obtained at 25° C.).

The temperature was raised to 60° C. over 50 minutes and kept constant for 2 hours, then the liquid phase was separated out by settling and siphoning. Seven washes with heptane (3 $dm^3$ each time) were carried out, 3 thereof at 60° C. and 4 at room temperature. The component in spherical form was vacuum-dried at 50° C.

The catalyst characteristics were as follow:

| | |
|---|---|
| Ti (total) | 8.1 wt. % |
| Mg | 11.38 wt. % |
| Cl | 46.7 wt. % |
| Si | 1.5 % wt |
| Al (residual) | 0.15 wt. % |
| —Oet | 7.2 wt. % |
| —OBu | 15.9 wt. % |
| residual solvent | 4 wt. % |

Comparative Example 1 and Example 1–3

A 4.5 L stainless-steel autoclave equipped with a helical magnetic stirrer, temperature and pressure indicator, feed line for ethylene, propane, hydrogen, 1-butene and a steel vial for the injection of the catalyst was used and purified by flushing ethylene at 80° C. and washing with propane.

In the following order, 11.4 ml of 10% (by wt/vol) TEAL/hexane solution (or 10 mmol of the TEAL/DMAC mixture, previously prepared by placing in contact the two compounds in the molar ratio indicated in table 1), and the solid catalyst prepared according to the above-disclosed procedure were mixed together at room temperature, matured for 5 minutes and introduced in the empty reactor in a stream of propane. The autoclave was then closed and 940 g of propane were introduced, after which the temperature was raised to 75° C. (10 minutes) with simultaneous introduction of 80 g of ethylene (6.8 bar, partial pressure) and 78 g (314 ml) of 1-butene. At the end, 1.45 bar of hydrogen (partial pressure) were added. Under continuous stirring, the total pressure was maintained at 75° C. for 120 minutes by feeding an ethylene/1-butene mixture (9:1 molar ratio). At the end, the reactor was depressurized and the polymerization stopped by injection of CO. The polymer recovered was dried under vacuum at 60° C. The results of the polymerization runs and the characteristics of the polymers are reported in Table 1.

Example 4

The polymerization was carried out according to the procedure described in the previous example, the only difference being that the solid catalyst was matured for 5 minutes only with 5 mmol of TEAL solution, and 5 mmol of DMAC were introduced into the empty autoclave. The results of the polymerization runs and the characteristics of the polymer are reported in Table 1.

Example 5

The polymerization was carried out according to the procedure described in Example 1, the only difference being that the solid catalyst was matured for 5 minutes only with 5 mmol of DMAC solution, and 5 mmol of TEAL were introduced into the empty autoclave.

The results of the polymerization runs and the characteristics of the polymer are reported in Table 1.

Example 6

The polymerization was carried out according to the procedure described in Example 1, the only difference being that the solid catalyst was matured for 5 minutes only with 5 mmol of DMAC solution, and 5 mmol of TEAL were injected into the autoclave after the propane diluent at 30° C. by using an excess pressure of ethylene. The results of the polymerization runs and the characteristics of the polymer are reported in Table 1.

Example 7

A 4.5 L stainless-steel autoclave equipped with a helical magnetic stirrer, temperature and pressure indicator, feed line for ethylene, propane, hydrogen, 1-butene and a steel vial for the injection of the catalyst was used and purified by flushing ethylene at 80° C. and washing with propane.

In the following order, 3.8 ml of 10%, by wt/vol (3.33 mmol), of TEAL/hexane solution and 6.2 ml of 10%, by wt/vol (6.7 mmol), of DMAC/hexane solution, were previously prepared and then 19 mg of the solid catalyst of Example 1 (Ti content, 8.1 wt. %), were mixed together at room temperature, matured for 5 minutes and introduced into the empty reactor in a stream of propane. The autoclave was then closed and 940 g of propane were introduced, after which the temperature was raised to 75° C. (10 minutes) with simultaneous introduction of 98 g of ethylene (8.3 bar, partial pressure) and 165 g (293 ml) of 1-butene. At the end, 1.5 bar of hydrogen (partial pressure) were added. Under continuous stirring, the total pressure was maintained at 75° C. for 60 minutes by feeding an ethylene/1-butene mixture (9:1 molar ratio). At the end, the reactor was depressurized and the polymerization stopped by injection of CO. The resulting polymer was then dried under vacuum at 60° C. 340 g. of polymer were recovered. The results of the polymerization runs and the characteristics of the polymers are reported in Table 1.

Comparative Example 2

A 4.5 L stainless-steel autoclave equipped with a helical magnetic stirrer, temperature and pressure indicator, feed line for ethylene, propane, hydrogen, 1-butene and a steel vial for the injection of the catalyst was used and purified by flushing ethylene at 80° C. and washing with propane.

In the following order, 18.5 ml of 10%, by wt/vol (20 mmol), of DMAC/hexane solution and 87.5 mg of the solid catalyst of Example 1 (Ti content, 8.1 wt. %), were mixed together at room temperature, matured for 5 minutes and introduced into the empty reactor in a stream of propane. The autoclave was then closed and 940 g of propane were introduced, after which the temperature was raised to 75° C. (10 minutes) with simultaneous introduction of 98 g of ethylene (8.3 bar, partial pressure) and 165 g (293 ml) of 1-butene. At the end, 3.1 bar of hydrogen (partial pressure) were added. Under continuous stirring, the total pressure was maintained at 75° C. for 60 minutes by feeding an ethylene/1-butene mixture (9:1 molar ratio). At the end, the reactor was depressurized and the polymerization stopped by injection of CO. The resulting polymer was dried under vacuum at 60° C. The results of the polymerization runs and the characteristics of the polymers are reported in Table 1.

Comparative Examples 3–5 and Examples 8–10

A 260 mL glass autoclave equipped with a magnetic stirrer, temperature and pressure indicator, and feed line for ethylene was used and purified and flushed with ethylene at 35° C. 120 ml of heptane and 30 ml of the 1-olefin indicated in Table 2 were introduced at room temperature.

The catalytic system was prepared separately in 10 ml (final volume) of heptane by consecutively introducing 1.5 ml of 10%, by wt/vol, alkylaluminum/heptane solution (or 1.31 mmol of the alkylaluminum/DMAC mixture, previously prepared by placing in contact the two aluminium alkyl solutions in the molar ratio indicated in Table 2), and the solid catalyst of Example 1 (Ti content, 8.1 wt. %) After stirring for 5 minutes, the solution, was introduced into the autoclave under a stream of ethylene, the reactor was closed, the temperature was raised to 70° C. and pressurized to 4.0 barg. The total pressure was kept constant by feeding ethylene.

After 60 minutes, the polymerization was stopped by cooling and degassing the reactor and by introducing 1 ml of methanol. The polymer obtained was washed with acidic methanol and then with methanol, and dried in an oven at 60° C. under vacuum. The polymerization results and the related polymer characteristics are reported in Table 2.

Comparative Example 6 and Example 11

Preparation of the Pre-polymer

A 260 mL glass autoclave equipped with a magnetic stirrer, temperature and pressure indicator, and feeding line for ethylene was used and purified by fluxing ethylene at 35° C. At room temperature were introduced 120 ml of heptane containing 10.5 mmol. of TEAL The catalytic system was prepared separately in 20 ml (final volume) of heptane by consecutively introducing 2 ml of 10% by wt/vol, TEAL/heptane solution and 6.8 g of the solid catalyst described in example 1. The suspension, was introduced into the autoclave under nitrogen flow, the reactor was closed and after 10 minutes stirring at 25° C., was pressurized with 0.2 bar of ethylene. The total pressure was kept constant by feeding ethylene to reach a conversion of 1(about 3 h) The polymerization was stopped by interrupting the ethylene feeding, the slurry was then filtered under nitrogen atmosphere and the residue was washed with dry hexane and dried under vacuum. Finally, 14.7 g of prepolymer (conversion of 1.17 g/g$_{cat}$) were obtained.

Polymerization with the pre-polymerized catalyst

The polymerization was carried out according to the procedure described in example 8 with the only differences that was used a polymerization temperature of 75° C. instead of 70° C. The polymerization conditions, the polymer amount and the related characteristics are reported in Table 3.

Example 12–13

Preparation of the Pre-polymer

The prepolymer was prepared according to the same procedure disclosed in example 11 with the difference that instead of TEAL was used a the same molar amounts of a mixture DMAC/TEAL having a molar ratio of 1. The pre-polymer (14.3 g) recovered was used in the subsequent copolymerization step without being washed.

Polymerization with the Pre-polymerized Catalyst

The polymerization was carried out according to the procedure described in Example 11. The polymerization conditions, the polymer amount and the related characteristics are reported in Table 3.

Comparative Example 7 and Example 14

Preparation of the Pre-polymer

The prepolymer was prepared according to the same procedure disclosed in example 12 with the difference that at the end of the procedure the 19.4 g obtained were washed with dry hexane and then dried under vacuum.

Polymerization with the Pre-polymerized Catalyst

The polymerization was carried out according to the procedure described in Example 11. The polymerization conditions, the polymer amount and the related characteristics are reported in Table 3.

Comparative Example 8 and Example 15

Preparation of Solid Catalyst Component

The spherical support, prepared according to the general method described in ex. 2 of U.S. Pat. No. 4,399,054 (but operating at 3000 rpm instead of 10000) was subjected to thermal treatment, under nitrogen flow, within the temperature range of 50–150° C., until spherical particles having a residual alcohol content of about 35 wt. % (1.1 mol of alcohol per mol of $MgCl_2$) were obtained.

16 g of this support were charged, under stirring at 0° C., to a 750 $cm^3$ reactor containing 320 $cm^3$ of pure $TiCl_4$ and 3.1 $cm^3$ of diisobutylphtalate, were slowly added and the temperature was raised to 100° C. in 90 minutes and kept constant for 120 minutes. Stirring was discontinued, settling was allowed to occur and the liquid phase was removed at the temperature of 80° C. Further 320 $cm^3$ of freshly $TiCl_4$ were added and the temperature was raised to 120° C. and kept constant for 60 minutes. After 10 minutes settling the liquid phase was removed at the temperature of 100° C. The residue was washed with anhydrous heptane (300 $cm^3$ at 70° C. then 3 times (250 $cm^3$ each time) with anhydrous hexane at 60° C. and further 4 at ambient temperature. The component in spherical form was vacuum dried at 50° C.

The catalyst characteristics were the following:

| | |
|---|---|
| Ti | 2.3 wt. % |
| Mg | 18.7 wt. % |
| Cl | 60.7 wt. % |
| diisobutylphtalate | 4.4 wt. % |

Ethylene/1-Butene Polynerization 4.0 liter stainless-steel autoclave equipped with a magnetic stirrer, temperature, pressure indicator, feeding line for ethylene, propane, 1-butene, hydrogen, and a steel vial for the injection of the catalyst, was purified by fluxing pure nitrogen at 70° C. for 60 minutes. It was then washed with propane, heated to 75° C. and finally loaded with 800 g of propane, 1-butene (as reported in table 4), ethylene (7.0 bar, partial pressure) and hydrogen (2.0 bar, partial pressure).

In a 100 $cm^3$ three neck glass flask were introduced in the following order, 50 $cm^3$ of anhydrous hexane, 9.6 $cm^3$ of 10% by wt/vol, aluminumalkyl/hexane solution (or the amount of aluminumalkyl/DMAC mixture indicated in table 4) and the solid catalyst component prepared as described above.

They were mixed together and stirred at room temperature for 20 minutes and then introduced in the reactor through the steel vial by using a nitrogen overpressure.

Under continuous stirring, the total pressure was maintained constant at 75° C. for 120 minutes by feeding ethylene. At the end the reactor was depressurised and the temperature was dropped to 30° C. The recovered polymer was dried at 70° C. under a nitrogen flow and weighted. The characteristics of the polymer obtained are reported in Table 4.

Comparative Example 9 and Example 16

Preparation of Solid Catalyst Components

Into a 500 mL four-necked round flask, purged with nitrogen, 250 mL of $TiC_4$ were introduced at 0° C. While stirring, 10.0 g of microspheroidal $MgCl_2.2.8C_2H_5OH$ (prepared according to the method described in ex.2 of U.S. Pat. No. 4,399,054 but operating at 3000 rpm instead of 10000 rpm) and 7.4 mmol of diethyl 2,3-diisopropylsuccinate were added. The temperature was raised to 100° C. and maintained for 120 min. Then, the stirring was discontinued, the solid product was allowed to settle and the supernatant liquid was siphoned off. Then 250 mL of fresh $TiCl_4$ were added. The mixture was reacted at 120° C. for 60 min and, then, the supernatant liquid was siphoned off. The solid was washed six times with anhydrous hexane (6×100 mL) at 60° C. Finally, the solid was dried under vacuum and analyzed.

The catalyst characteristics were the following:

| | |
|---|---|
| Ti | 3.3 wt. % |
| Mg | 16.95 wt. % |
| diethyl 2,3-diisopropylsuccinate | 13.5 wt. % |

Ethylene/1-butene Polymerization

The same procedure disclosed in Example 15 was used with the only difference that cyclohexylmethyl-dimethoxysilane was used as external donor in such an amount to give an Al/donor molar ratio of 15. The characteristics of the polymer obtained are reported in Table 5.

Comparative Example 10 and Example 17

The polymerization was carried out according to the procedure described in Example 8 with the only difference that DIOAH (di-(2,4,4-trimethylpentyl)aluminium hydride) was used in place of TEAL and that the solid catalyst component was prepared according to the procedure described in Ex.15. The polymerization conditions, the polymer amount and the related characteristics are reported in Table 5.

Example 18

The polymerization was carried out according to the procedure described in Example 1 with the only difference that DIOAH (di-(2,4,4-trimethylpentyl)aluminium hydride) was used in place of TEAL and that the solid catalyst component was prepared according to the procedure described in Ex. 15. The polymerization conditions, the polymer amount and the related characteristics are reported in Table 5.

Comparative Example 11 and Example 19

Preparation of the Solid Component

The spherical support, prepared according to the general method underwent a thermal treatment, under $N_2$ stream, over a temperature range of 50–150° C. until spherical particles having a residual alcohol content of about 25% (0.69 mole of alcohol for each $MgCl_2$ mole) were obtained.

Into a 72 l steel reactor provided with stirrer, 44 liters of TiCl at 0° C. and whilst stirring 2200 g of the support were introduced. The whole was heated to 130° C. over 60 minutes and these conditions were maintained for a further 60 minutes. The stirring was interrupted and after 30 minutes the liquid phase was separated from the settled solid. Thereafter 4 washings with anhydrous hexane (about 22 liters) were performed two of which were carried out at 80° C. and two at room temperature.

Then, after the addiction of 31 liters of anhydrous hexane, 11 liters of a solution of tris(2,4,4-trimethyl-pentyl) aluminum (Tioa) in hexane (100 g/l) were introduced at room temperature into the reactor and stirred for 30 minutes. The liquid phase was separated from the settled solid that was washed with 22 liters of hexane and with 22 liters of heptane (twice for each other) at room temperature.

Thereafter a further treatment with 44 liters of TiCl4 was performed in the same condition with respect to the first one, and after 4 washings with anhydrous hexane, 2200 g of the spherical solid component were obtained. After drying under vacuum at about 50° C., the solid showed the following characteristics:

| | |
|---|---|
| Total titanium | 4.6% (by weight) |
| $Ti^{III}$ | 0.6% (by weight) |
| Al | 0.11% (by weight) |
| Mg | 17.0% (by weight) |
| Cl | 73.4% (by weight) |
| OEt | 0.3% (by weight) |

Polymerization

The polymerization was carried out according to the procedure described in Example 8. The polymerization conditions, the polymer amount and the related characteristics are reported in Table 6.

Comparative Example 12 and Example 20

Preparation of Solid Catalyst Component 10.0 g of microspheroidal $MgCl_2 \cdot 2.8C_2H_5OH$ (prepared according to the method described in ex.2 of U.S. Pat. No. 4,399,054 but operating at 3,000 rpm instead of 10,000) were subject to thermal dealcoholation carried out at increasing temperatures from 30 to 95° C. and operating in nitrogen current until a molar ratio $EtOH/MgCl_2$ of about 1 was obtained.

The so obtained adduct was poured into a 500 ml four-necked round flask, purged with nitrogen, which contained 250 ml of TiCl4 introduced at 0° C. The flask was heated to 40° C. and 6 mmoles of diisobutylphthalate (DIBP) were thereupon added. The temperature was raised to 100° C. and maintained for two hours, then the stirring was discontinued, the solid product was allowed to settle and the supernatant liquid was siphoned off. The treatment with $TiCl_4$ was repeated and the solid obtained was washed six times with anhydrous hexane (6×100 ml) at 60° C. and then dried under vacuum.

Ethylene Pre-polymerization

The catalyst component prepared according to the above procedure was pre-polymerized with ethylene to give a weight ratio pre-polymer/catalyst of 2.3 g/g. The pre-polymerization was carried out in hexane using TEAL as cocatalyst (weight ratio TEAL/cat 0.05).

Treatment Stage with the Ti Compound

The so obtained ethylene pre-polymer, was suspended in liquid $TiCl_4$ also containing diisobutylphthalate. The amounts of reactants were such as to give a concentration of pre-polymer in the liquid phase of 60 g/l and an amount of diisobutylphthalate of 5% with respect to the prepolymer. The temperature was then raised at 80° C. and the system was kept under these conditions, with stirring, for 1 hour. After that time stirring was discontinued the liquid siphoned off and the solid washed with hexane at 60° C. The titanation step was then repeated according to the above procedure except for the omitted use of diisobutylphthalate and for the shorter reaction time (30 min.).

Ethylene Copolymerization

A 15.0 liter stainless-steel fluidized reactor equipped with gas-circulation system, cyclone separator, thermal exchanger, temperature and pressure indicator, feeding line for ethylene, propane, 1-butene, hydrogen, and a 1 L steel reactor for the catalyst prepolymerization and injection of the prepolymer. The gas-phase apparatus was purified by fluxing pure nitrogen at 40° C. for 12 hours and then was circulated a propane (10 bar, partial pressure) mixture containing 1.5 g of TEAL at 80° C. for 30 minutes. It was then depressurized and the reactor washed with pure propane, heated to 75° C. and finally loaded with propane (2 bar partial pressure), 1-butene (as reported in Table 4), ethylene (7.1 bar, partial pressure) and hydrogen (2.1 bar, partial pressure).

In a 100 mL three neck glass flask were introduced in the following order, 20 mL of anhydrous hexane, the amount of alkylaluminum reported in table 7, 0.05 g of the prepolymerized catalyst and cyclohexylmethyl-dimethoxysilane in such an amount to give an Al/donor molar ratio of 15. They were mixed together and stirred at room temperature for 5 minutes and then introduced in the prepolymerization reactor maintained in a propane flow. The autoclave was closed and 80 g of propane and 90 g of propene were introduced at 40° C. The mixture was allowed stirring at 40° C. for 1 h. The autoclave was then depressurized to eliminate the excess of non-reacted propene, and the obtained prepolymer was injected into the gas-phase reactor by using a propane overpressure (1 bar increase in the gas-phase reactor). The final pressure, in the fluidized reactor, was maintained constant during the polymerization at 75° C. for 180 minutes by feeding a 10 wt. % 1-butene/ethene mixture. At the end, the reactor was depressurised and the temperature was dropped to 30° C. The collected polymer was dried at 70° C. under a nitrogen flow and weighted.

The polymer characteristics are collected in Table 7.

TABLE 1

| Example | Catalyst Mg | Alkyaluminum Type | m. ratio | mmol | Activity Kg/gcat | Melt Index E Dg/min | F dg/min | F/E | 1-C$_4$- (I.R.) wt. % | Density g/ml | D.S.C. Tc ° C. | Tm ° C. | ΔH J/g | X.S. Wt. % |
|---|---|---|---|---|---|---|---|---|---|---|---|---|---|---|
| Comp. 1 | 34.2 | TEAL | — | 10 | 10.06 | 0.74 | 33.9 | 45.8 | 10.4 | 0.9183 | 105.9 | 123.1 | 114.5 | 13.2 |
| 1 | 21.3 | DMAC-TEAL | 0.5 | 10 | 13.90 | 1.9 | 63.6 | 33.5 | 13.8 | 0.9051 | 104.6 | 122.4 | 92.0 | 21.3 |
| 2 | 19.4 | DMAC-TEAL | 2 | 10 | 19.48 | 2.8 | 80.2 | 28.6 | 15.5 | 0.9076 | 104.7 | 122.5 | 95.8 | 24.8 |
| 3 | 23.4 | DMAC-TEAL | 1 | 10 | 17.95 | 2.4 | 67.2 | 28.0 | 13.3 | 0.9092 | 103.8 | 122.4 | 93.7 | 20.6 |
| 4 | 19.5 | DMAC-TEAL | 1 | 10 | 21.85 | 2.6 | 69.7 | 26.8 | 12.2 | 0.9100 | 102.8 | 122.0 | 98.0 | 21.3 |
| 5 | 19.3 | DMAC-TEAL | 1 | 10 | 17.25 | 2.5 | 78.2 | 31.3 | 13.7 | 0.9101 | 104.8 | 122.4 | 95.6 | 23.3 |
| 6 | 19 | DMAC-TEAL | 1 | 10 | 14.89 | 3.5 | 150.0 | 42.9 | 15.9 | | 101.4 | 122.1 | 84.3 | 25.6 |
| 7 | 19 | DMAC-TEAL | 2 | 10 | 17.9 | 2.2 | 57.9 | 26.3 | 10.5 | 0.9146 | 104.9 | 122.3 | 103.5 | 17.2 |
| Comp. 2 | 87.5 | DMAC | — | 20 | 2.2 | 0.11 | 3.2 | 29.1 | 9.8 | 0.9166 | | 123 | 103 | 17.2 |

TABLE 2

| Example | Catalyst mg | alkyaluminum Type | mol. ratio | mmol | α-olefin Type | Activity Kg/gcat | α-olefin ($^1$H NMR) mol. % | DSC Tc ° C. | Tm ° C. | ΔH J/g |
|---|---|---|---|---|---|---|---|---|---|---|
| Comp. 3 | 8.7 | TEAL | — | 1.31 | 1-hexene | 1.2 | 5.7 | 102.8 | 124.0 | 127.2 |
| 8 | 6.4 | DMAC/TEAL | 1 | " | " | 2.4 | 15.7 | 102.0 | 121.5 | 48 |
| Comp. 4 | 6.1 | TIBAL | — | " | " | 0.34 | 2.5 | 103.0 | 126.8 | 129.3 |
| 9 | 9.7 | DMAC/TIBAL | 1 | " | " | 1.4 | 19.0 | 100.8 | 121.6 | 34.1 |
| Comp. 5 | 7.1 | TEAL | — | " | 1-octene | 1.9 | 2.5 | 104.9 | 128.9 | 122.4 |
| 10 | 4.2 | DMAC/TEAL | 1 | " | " | 4.5 | 4.6 | 104.6 | 124.1 | 89.7 |

TABLE 3

| Example | Cat. mg | alkyaluminum Kind and molar ratio | Mmol | α-olefin Type | Polymer G | Activity g/gcat | I.V. dl/g | C6-tot. % mol | DSC Tc (° C.) | Tm (II) (° C.) | ΔHf J/g |
|---|---|---|---|---|---|---|---|---|---|---|---|
| Comp. 6 | 8.8 | TEAL | 1.31 | 1-hexene | 9.43 | 1072 | 6.95 | 4.2 | 104.1 | 125.7 | 137.8 |
| 11 | 8.3 | TEAL/DMAC 1-1 | 1.31 | " | 16.32 | 1966 | 5.37 | 8.8 | 95.7 | 122.1 | 104 |
| 12 | 8.5 | " | " | " | 16.52 | 1944 | 6.56 | 5.2 | 104.1 | 124.8 | 125.7 |
| 13 | 6 | " | " | " | 15.73 | 2622 | 3.97 | 6.9 | 99.5 | 123.2 | 93.4 |
| Comp. 7 | 10.2 | " | " | " | 12.22 | 1198 | 6.71 | 3.6 | 103.8 | 126 | 123 |
| 14 | 10.4 | " | " | " | 16.06 | 1544 | 3.16 | 10.2 | 100.4 | 122.3 | 88.1 |

TABLE 4

| Example | Aluminumalkyl Kind and ratio | g | PC$_2^-$ Al/Ti bar | 1-Butene G | Polymer G | Kg/g cat | 1-C$_4$ % w | density g/ml. | DSC Tc | Tm (II) | ΔH | X.S. |
|---|---|---|---|---|---|---|---|---|---|---|---|---|
| Comp 8 | TEAL | 0.96 | 1041 7 | 250 | 270 | 17.4 | 16.7 | 0.9156 | 103.1 | 122.5 | 86.4 | 26.2 |
| 15 | TEAL/DMAC 1/1 | 0.87 | 1766 7 | 200 | 210 | 23.3 | 17.0 | 0.9040 | 103.6 | 124.0 | 95.0 | 30.1 |

TABLE 5

| Example | Aluminumalkyl Kind and ratio | g | PC$_2^-$ bar | 1-Butene g | Activity Kg/g cat | 1-C4 % w | density g/ml. |
|---|---|---|---|---|---|---|---|
| Comp 9 | TEAL | 0.96 | 7 | 150 | 14.4 | 16.7 | 0.9242 |
| 16 | TEAL/DMAC 7/3 | 0.89 | 7 | 150 | 22.7 | 17.0 | 0.9093 |

TABLE 6

| Example | Cat. mg | Aluminumalkyl Kind and ratio | 1-C6- mmol | Polymer ml | Activity G | I.V. g/gcat | 1-C$_6$ dl/g | Tc % w | DSC$^§$ Tm (II) (° C.) | □H (° C.) J/g |
|---|---|---|---|---|---|---|---|---|---|---|
| Comp 10 | 13.2 | DIOA-H | 1.31 | 30 | 4.36 | 330.3 | 2.7 | 8.0 | 106 | 125.9 | 108.4 |
| 17 | 9.3 | DIOA-H/DMAC | 1.31 | 30 | 15.25 | 1640 | 8.1 | 16.4 | 101 | 125.8 | 91.5 |

TABLE 7

| Example | Cat. Mg | Aluminumalkyl Kind and ratio | Mmol | PC$_2^-$ bar | 1-Butene g | Polymer g | Kg/g cat | 1-C4 % w |
|---|---|---|---|---|---|---|---|---|
| 18 | 35 | DIOAH/DMAC 1/1 | 8.42 | 8.4 | 166 | 320 | 9.1 | 14.7 |

TABLE 8

| Example | Cat. mg | Aluminumalkyl Kind and ratio | 1-C6- Mmol | Ml | P C2- Bar | time min | polymer g | g/gcat | I.V. dl/g | 1-C6-tot. % mol |
|---|---|---|---|---|---|---|---|---|---|---|
| Comp. 11 | 5.5 | TEA | 1.31 | 10.0 | 5.0 | 60 | 28.6 | 5193 | 7.1 | 3.3 |
| 19 | 5.1 | TEAL/DMAC 1-1 | 1.31 | 10.0 | 5.0 | 60 | 27.1 | 5306 | 5.6 | 5.4 |

TABLE 9

| Example | Cat. mg | Aluminumalkyl Kind and ratio | 1-Butene g | Activity Bar | 1-C4 Kg/g cat | density % w | DSC □H g/ml | X.S. J/g wt % |
|---|---|---|---|---|---|---|---|---|
| Comp 12 | 0.05 | TEAL | 0.96 | 2.3 | 15.4 | 7.5 | 0.9177 | 116.1 | 11 |
| 20 | 0.05 | TEAL/DMAC 7/3 | 0.96 | 2.3 | 22 | 9.5 | 0.9163 | 120 | 17.8 |

What is claimed is:

1. A catalyst system for the polymerization of olefins CH$_2$=CHR, wherein R is hydrogen or a hydrocarbon radical having 1–12 carbon atoms, comprising: (a) a solid catalyst component comprising Mg, Ti and halogen, and a co-catalyst mixture comprising (b) dimethylaluminium chloride and (c) an alkylaluminium compound wherein in said mixture the compounds (b) and (c) are in a molar ratio (b)/(c) ranging between 0.3 and 5.

2. The catalyst system according to claim 1, in which the ratio between (b) and (c) is between 0.3 and 3.

3. The catalyst system according to claim 1, in which the alkylaluminium is selected from the compounds of formula AlR$^1{}_{3-y}$H$_y$ where y is from 0 to 2 and R$^1$ is a hydrocarbon group having from 1 to 15 carbon atoms.

4. The catalyst system according to claim 3, which the alkylaluminium is a trialkylaluminium selected from those of formula AlR$^1{}_{3-y}$H$_y$ in which y is 0 and R$^1$ is a C2–C10 alkyl radical.

5. The catalyst system according to claim 4, which the trialkylaluminium is triethylaluminium or triisobutylaluminium.

6. The catalyst system according to claim 1, in which the component (a) comprises a titanium compound supported on a magnesium chloride.

7. The catalyst system according to claim 6, which the titanium compound is selected from those of formula Ti(OR$^2$)$_{n-y}$X$_y$ where X is chlorine, n is the valence of titanium, y is a number between 0 and n, and the R$^2$ groups, which may be the same or different, are hydrocarbon radicals having from 1 to 10 carbon atoms.

8. The catalyst system according to claim 7, in which the titanium compound is selected from TiCl$_4$, TiCl$_3$, titanium (IV) butoxide, titanium (IV) isopropoxide, trichlorobutoxytitanium (IV), or dichlorobutoxytitanium (III).

9. The catalyst system according to claim 1 further comprising an internal electron donor compound.

10. The catalyst system according to claim 9 in which the internal electron donor compound is selected from alkyl, cycloalkyl or aryl esters of polycarboxylic acids.

11. The catalyst system according to claim 10 in which the esters of polycarboxylic acids are phthalates or succinates.

12. The catalyst system according to claim 1 in which the component (a) is obtained by reacting a titanium compound selected from those of formula $Ti(OR^2)_{n-y}X_y$, where X is chlorine, n is the valence of titanium, y is a number between 0 and n, and the $R^2$ groups, which may be the same or different, are hydrocarbon radicals having from 1 to 10 carbon atoms, with a magnesium chloride derived from an adduct of formula $MgCl_2 \cdot pROH$, where p is a number between 0.1 and 6, and R is a hydrocarbon radical having 1–18 carbon atoms.

13. The catalyst system according to claim 12 having a surface area (by the B.E.T. method) from 20 and 500 $m^2/g$, and a porosity (Hg method) due to pores with a radius up to 10,000 Å from 0.3 to 1.5 $cm^3/g$.

14. The catalyst system according to claim 1, obtained by first placing the components (a) and (c) in contact and then reacting the product thus obtained with the component (b).

15. The catalyst system according to claim 1, obtained by placing the component (a) in contact with the cocatalyst mixture of (b) and (c).

16. The catalyst system according to claim 1, obtained by first placing the components (a) and (b) in contact and then reacting the product thus obtained with the component (c).

17. The catalyst system according to claim 1 wherein the catalyst component (a) is pre-polymerized with at least one of ethylene and α-olefins.

18. The catalyst system according to claim 17 wherein the catalyst component (a) is pre-polymerized with ethylene up to forming amounts of polymer from about 0.1 g per gram of solid component up to about 100 g per gram of solid catalyst component.

19. The catalyst system according to claim 17 herein the pre-polymerized catalyst component is further treated with $TiCl_4$ before being used in the main polymerization step.

20. The catalyst system according to claim 12, where p is a number between 2 and 3.5.

21. A process for the polymerization of olefins $CH_2$=CHR, wherein R is hydrogen or a hydrocarbon radical having 1–12 carbon atoms, carried out in the presence of a catalyst system for the polymerization of olefins $CH_2$=CHR, wherein R is hydrogen or a hydrocarbon radical having 1–12 carbon atoms, comprising: (a) a solid catalyst component comprising Mg, Ti and halogen, and a co-catalyst mixture comprising (b) dimethylaluminium chloride and (c) an alkylaluminium compound wherein in said mixture the compounds (b) and (c) are in a molar ratio (b)/(c) ranging between 0.3 and 5.

22. A process for the preparation of copolymers of ethylene with one or more alpha-olefins having from 3 to 12 carbon atoms, having a mole content of units derived from the ethylene of higher than 80%, wherein the polymerization of ethylene and said alpha-olefins is carried out in the presence of a catalyst system for the polymerization of olefins $CH_2$=CHR, wherein R is hydrogen or a hydrocarbon radical having 1–12 carbon atoms, comprising: (a) a solid catalyst component comprising Mg, Ti and halogen, and a co-catalyst mixture comprising (b) dimethylaluminium chloride and (c) an alkylaluminium compound wherein in said mixture the compounds (b) and (c) are in a molar ratio (b)/(c) ranging between 0.3 and 5.

23. The process according to claim 21 carried out in the gas phase.

24. The process according to claim 22 carried out in gas-phase.

* * * * *